(12) United States Patent
Wagner et al.

(10) Patent No.: US 10,605,248 B2
(45) Date of Patent: Mar. 31, 2020

(54) EXTERNAL ROTOR MOTOR WITH INTEGRATED BEARING HOUSING AND BOX FOR CONTROL ELECTRONICS

(75) Inventors: Thomas Wagner, Schwaebisch Hall (DE); Francisco Rojo, St. Georgen (DE)

(73) Assignee: ebm-papst St. Georgen GmbH & Co. KG, St. Georgen (DE)

(*) Notice: Subject to any disclaimer, the term of this patent is extended or adjusted under 35 U.S.C. 154(b) by 380 days.

(21) Appl. No.: 13/577,258

(22) PCT Filed: Feb. 25, 2011

(86) PCT No.: PCT/EP2011/000934
§ 371 (c)(1),
(2), (4) Date: Aug. 5, 2012

(87) PCT Pub. No.: WO2011/113521
PCT Pub. Date: Sep. 22, 2011

(65) Prior Publication Data
US 2013/0039783 A1    Feb. 14, 2013

(30) Foreign Application Priority Data

Mar. 15, 2010 (DE) .................... 20 2010 003 890 U

(51) Int. Cl.
*F04D 25/06* (2006.01)
*H02K 1/27* (2006.01)
(Continued)

(52) U.S. Cl.
CPC ....... *F04D 25/062* (2013.01); *F04D 25/0646* (2013.01); *F04D 25/0693* (2013.01);
(Continued)

(58) Field of Classification Search
CPC ...... H02K 5/1735; H02K 1/2786; H02K 1/32; H02K 3/522; H02K 11/0073; H02K 3/34;
(Continued)

(56) References Cited

U.S. PATENT DOCUMENTS 4,337,405 A * 6/1982 Hishida ................ H02K 5/1735
29/596
4,636,669 A * 1/1987 Plunkett et al. ................ 310/51
(Continued)

FOREIGN PATENT DOCUMENTS

WO    WO 98-19382    5/1998

*Primary Examiner* — Bryan M Lettman
(74) *Attorney, Agent, or Firm* — Dickinson Wright PLLC

(57) ABSTRACT

A fan has an electronically commutated external-rotor motor serving to drive it. The motor has an internal stator (20) having a stator lamination stack (64) and a winding arrangement (66; 164, 166, 168, 170) associated with the stack. The internal stator has a central opening (149) for journaling a shaft (42). The fan further has a permanent-magnet rotor (28) separated from the internal stator (20) by a magnetically effective air gap (99). The internal stator (20) has a plastic coating (56, 58) that surrounds the stator windings, forms a bearing tube for journaling the shaft (42), and defines a wall element (62), implemented integrally with the plastic coating (56, 58), forming a compartment or cavity (108) for electrical components (112) of the motor. The plastic coating, bearing tube and compartment are preferably molded in a single working step.

20 Claims, 14 Drawing Sheets

(51) Int. Cl.

| | | |
|---|---|---|
| *H02K 1/32* | (2006.01) | |
| *H02K 3/52* | (2006.01) | |
| *H02K 5/173* | (2006.01) | |
| *H02K 3/34* | (2006.01) | |
| *H02K 3/50* | (2006.01) | |
| *F04D 29/26* | (2006.01) | |
| *F04D 29/059* | (2006.01) | |
| *F04D 29/32* | (2006.01) | |
| *F04D 29/056* | (2006.01) | |
| *F04D 25/08* | (2006.01) | |
| *F04D 29/52* | (2006.01) | |

(52) U.S. Cl.
CPC ......... *F04D 25/082* (2013.01); *F04D 29/059* (2013.01); *F04D 29/0563* (2013.01); *F04D 29/263* (2013.01); *F04D 29/326* (2013.01); *F04D 29/329* (2013.01); *F04D 29/526* (2013.01); *H02K 1/2786* (2013.01); *H02K 1/32* (2013.01); *H02K 3/34* (2013.01); *H02K 3/50* (2013.01); *H02K 3/521* (2013.01); *H02K 3/522* (2013.01); *H02K 5/1735* (2013.01)

(58) Field of Classification Search
CPC . H02K 3/50; H02K 3/52; H02K 3/521; F04D 25/062; F04D 25/0646; F04D 29/526; F04D 29/0563; F04D 25/082; F04D 29/329; F04D 29/326; F04D 29/325; F04D 29/263; F04D 29/059; F04D 25/0693
See application file for complete search history.

(56) References Cited

U.S. PATENT DOCUMENTS

| | | | | |
|---|---|---|---|---|
| RE34,001 E | * | 7/1992 | Wrobel | H01R 4/2412 310/71 |
| 5,343,104 A | * | 8/1994 | Takahashi et al. | 310/90 |
| 5,973,424 A | | 10/1999 | Engelberger | 310/43 |
| 6,394,767 B1 | * | 5/2002 | Matsumoto | F04D 25/08 310/71 |
| 6,511,303 B2 | * | 1/2003 | Obara | F04D 25/0606 417/423.12 |
| 6,916,160 B2 | * | 7/2005 | Obara | 417/354 |
| 2005/0123423 A1 | * | 6/2005 | Weisser | 417/423.7 |
| 2006/0220475 A1 | * | 10/2006 | Goto | H02K 37/12 310/49.01 |
| 2007/0001529 A1 | * | 1/2007 | Takahashi | H02K 5/10 310/88 |
| 2008/0118379 A1 | * | 5/2008 | Uchise et al. | 417/423.1 |
| 2010/0019586 A1 | * | 1/2010 | Lu | 310/43 |
| 2010/0127588 A1 | * | 5/2010 | Horng | 310/90 |

* cited by examiner

EXTERNAL ROTOR MOTOR WITH INTEGRATED BEARING HOUSING AND BOX FOR CONTROL ELECTRONICS

CROSS-REFERENCE

This application is a § 371 of PCT/EP2011/000934, filed 2011 Feb. 25.

FIELD OF THE INVENTION

The invention relates to an external-rotor motor, and it relates to a fan having an external-rotor motor serving to drive it.

BACKGROUND

Such fans are used in large numbers, chiefly for cooling electronic devices, for example computers, servers, high-performance television sets, etc. Great importance is attached to an inexpensive but still robust design that, in particular, can also be expected to offer a long service life for the fan.

SUMMARY OF THE INVENTION

It is therefore an object of the invention to make available a novel external-rotor motor and a fan of the kind recited above.

According to the invention, this object is achieved by forming a bearing tube, for the electronically commutated motor, integrally with a housing portion defining an air passage conduit, and with a box adapted to contain motor control circuits. A fan of this kind has a very simple design and can therefore be manufactured inexpensively. When the motor is manufactured, the bearing tube of the motor and the external housing of the fan can be manufactured in one working step. Improved motor efficiency is also obtained, since the lamination cross section of the stator can be enlarged without enlarging the dimensions of the fan, enabling a higher fan rotation speed and thus higher fan output.

This also makes possible a more compact design and allows selection from a larger number of rotor magnets, and it is more easily possible to optimize costs.

The invention thus makes it possible to manufacture a better product at reduced cost.

Further details and advantageous refinements of the invention are evident from the exemplifying embodiments, in no way to be understood as a limitation of the invention, that are described below and depicted in the drawings.

BRIEF FIGURE DESCRIPTION

Figure 13:
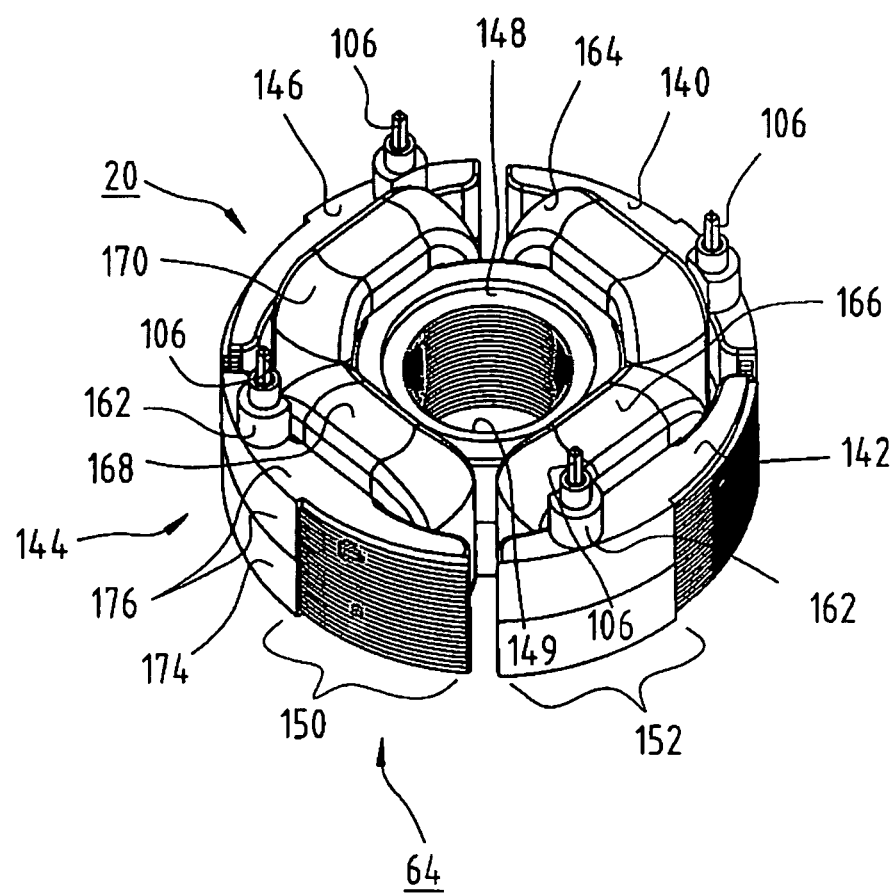

FIG. 13 shows identical salient poles 140, 142, 144, 146 and a magnetic yoke 148 inside which bearing tube 56 (FIG. 1) is located when the fan is complete.

Figure 14:
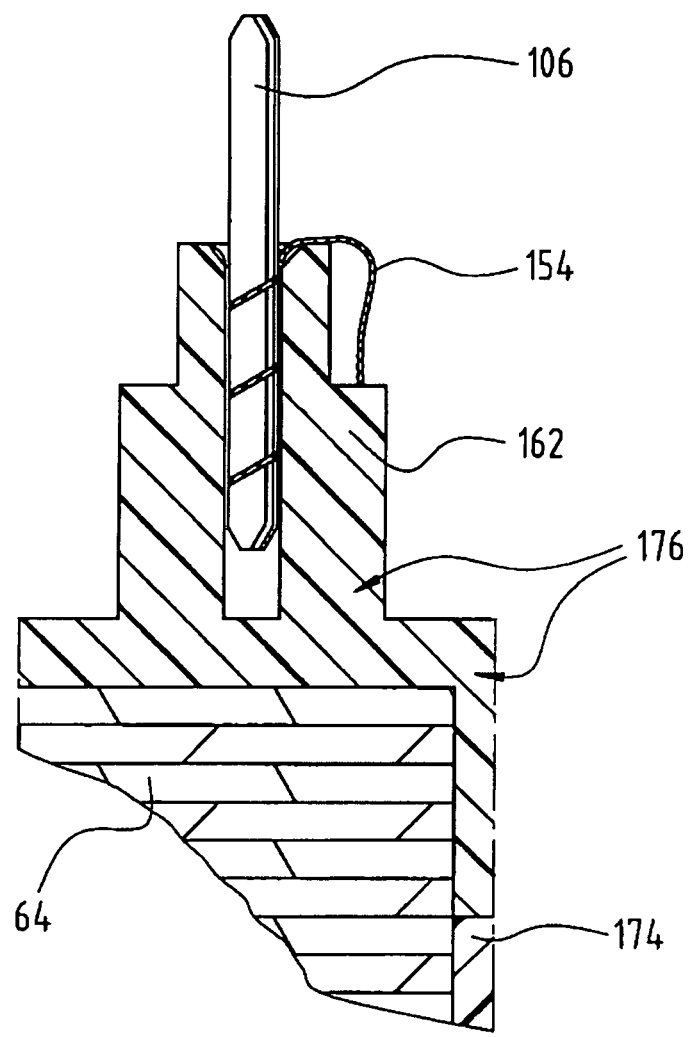

FIG. 14 is a sectioned depiction of a contact pin that serves for connecting the internal stator to the circuit board.

DETAILED DESCRIPTION

Figure 1:
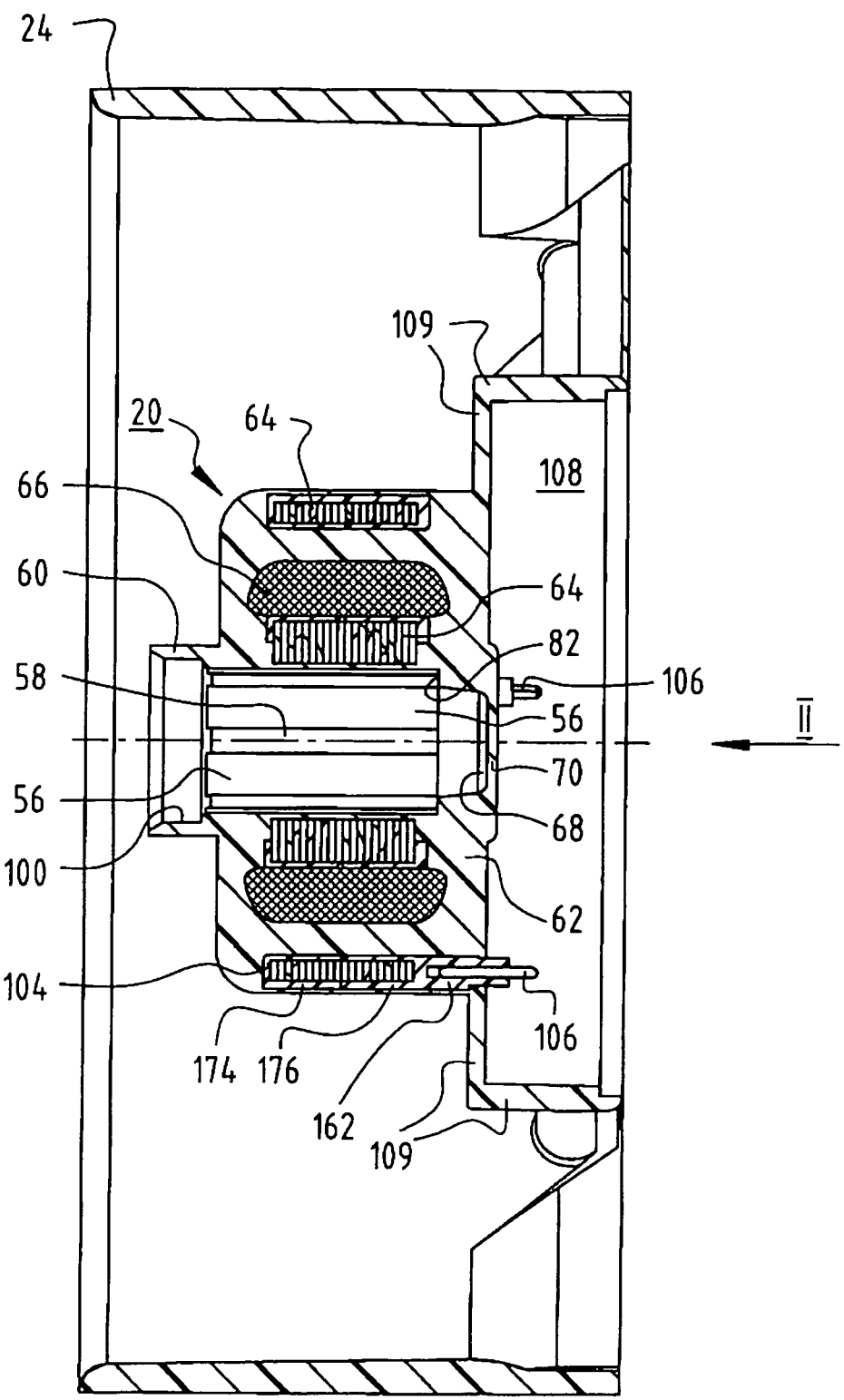
FIG. 1 is a longitudinal section through the basic framework of an external-rotor motor including its internal stator and its fan housing.
Figure 9:
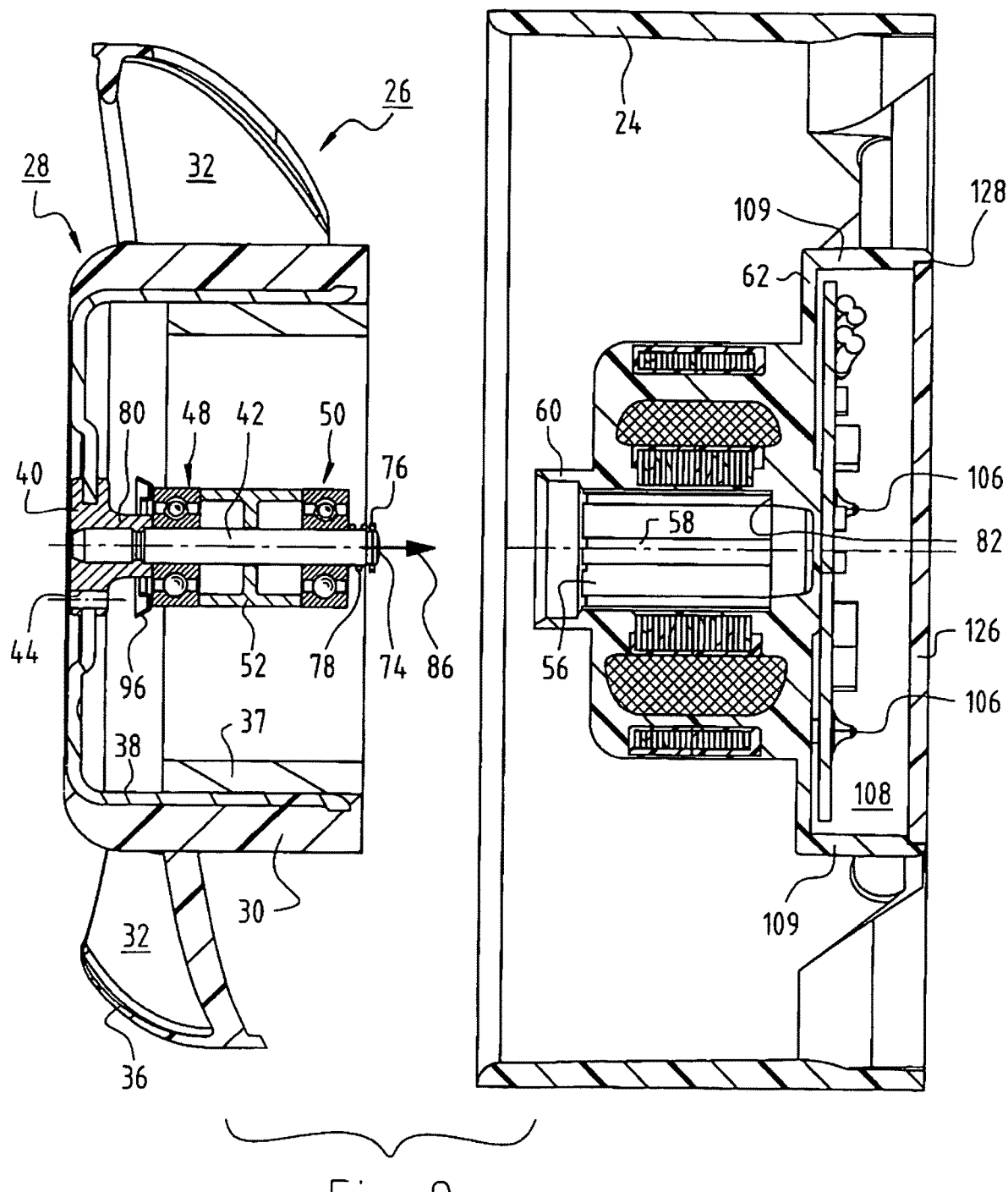
FIG. 9 is a depiction analogous to FIG. 7, in the context of assembly of the permanent-magnet rotor.
Figure 10:
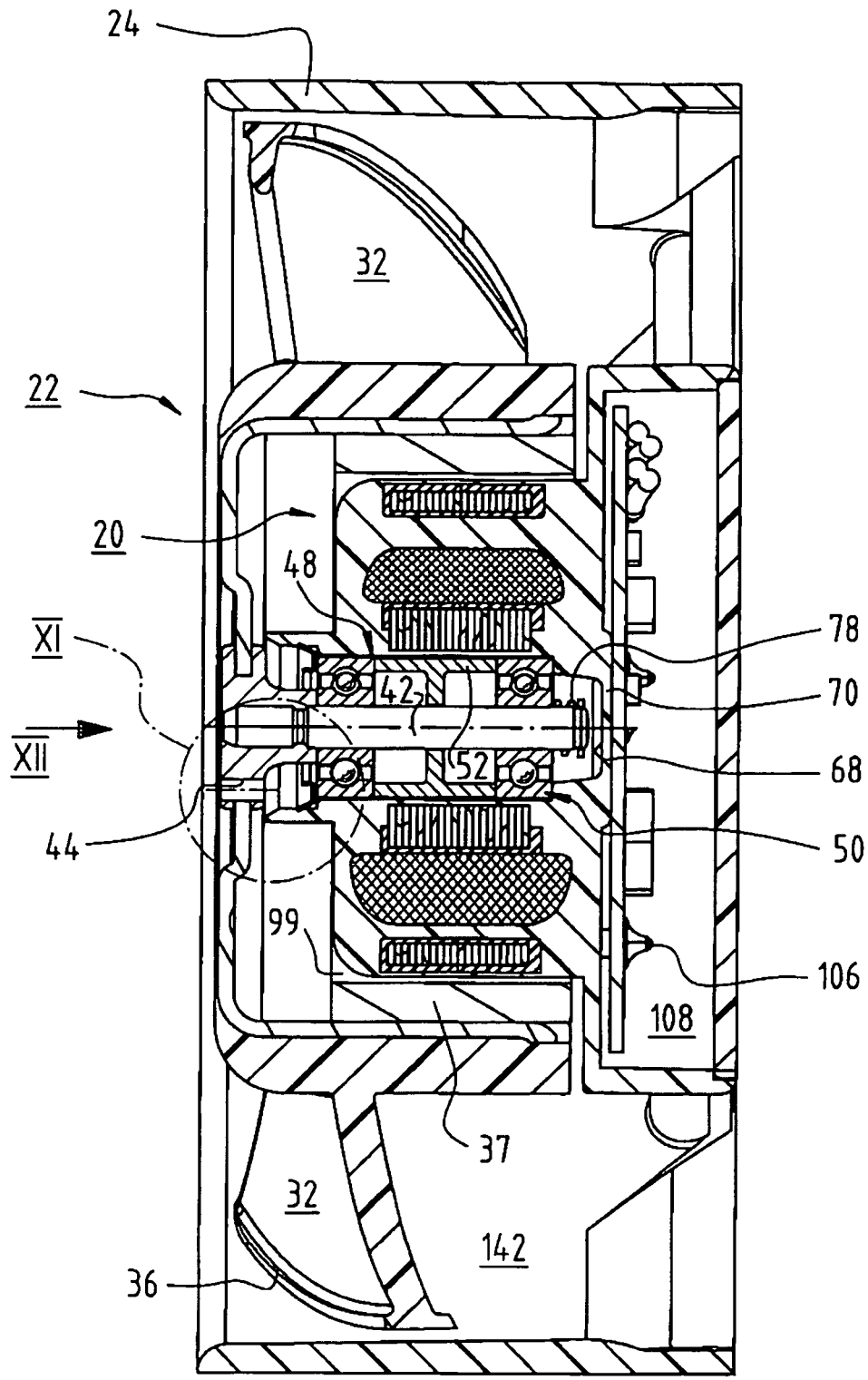
FIG. 10 is a sectioned depiction of the motor of FIG. 9 in the assembled state, viewed along line X-X of FIG. 12.
Figure 12:
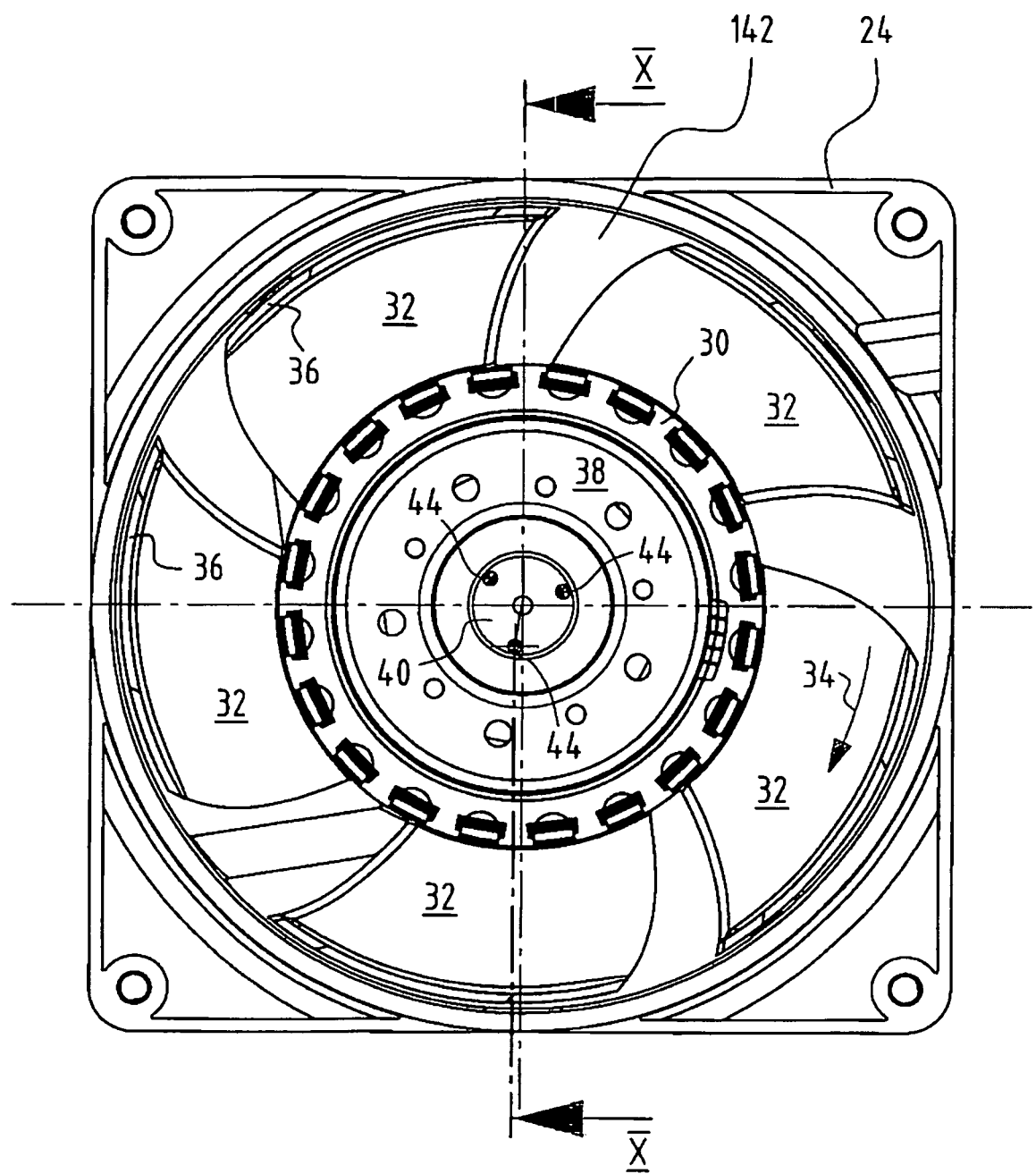
FIG. 12 is a plan view looking along arrow XII of FIG. 10.

FIG. 1 is a longitudinal section through internal stator 20 of an external-rotor motor 22 depicted in FIG. 10 and its fan housing 24, in which a fan wheel 26 (FIG. 9) rotates during operation. The wheel is constituted by an external rotor 28 on whose outer circumference 30 fan blades 32 are implemented. The rotation direction of external rotor 28 is labeled 34 in FIG. 12.

Each fan blade 32 preferably has on its outer periphery an enlargement 36, in order to improve the efficiency of fan wheel 26.

As FIG. 9 shows, external rotor 28 has a cup-shaped magnetic yoke 38 made of soft iron, and the latter is connected at its center to a hub 40 in which a shaft 42 is secured in the manner depicted. Hub 40 has openings 44 that are utilized upon assembly of the fan, and whose function will be further explained below.

Shaft 42 has two rolling bearings to journal it, namely a first rolling bearing 48 on the side of shaft 42 facing toward rotor 28, and a second rolling bearing 50 on the side of shaft 42 facing away from rotor 28. Located between the outer rings of rolling bearings 48, 50 is a spacing member 52 (see FIG. 9). This is guided on shaft 42.

A bearing tube 56, which is depicted in FIG. 1, serves to receive rolling bearings 48, 50 and spacing member 52. Said tube has, on its inner circumference, longitudinal ribs 58 whose radially inner ends define a circular enveloping curve. The outer rings of the two bearings 48, 50 are guided in ribs 58.

Bearing tube 56 transitions to the left into a collar 60 (see FIG. 1). It transitions further into a partly insulating casing 62 of internal stator 20, whose stator lamination stack, packeted in the usual manner, is labeled 64, and whose winding arrangement is labeled 66.

Provided in this casing 62 as a continuation of bearing tube 56 is a dimple-like recess 68 whose bottom 70 closes off bearing tube 56 in fluid-tight fashion at this location.

As FIG. 10 shows, bottom 70 forms an axial tolerance region for free end 74 (FIG. 9) of shaft 42, i.e. free end 74 does not abut against bottom 70. A snap ring 76 is provided in the region of free end 74 in a groove of shaft 42, and provided between said snap ring 76 and the inner ring of rolling bearing 50 is a compression spring 78 that clamps the inner rings of rolling bearings 48, 50 against one another, since a projection 80 (FIG. 11) of hub 40, which latter is fixedly connected to shaft 42, abuts against the inner ring of rolling bearing 48, while spring 78 pushes the inner ring of rolling bearing 50 to the left in FIG. 9, so that the inner rings of rolling bearings 48, 50 are clamped against one another.

As FIG. 10 shows, the outer ring of rolling bearing 50 abuts against a shoulder 82 (FIG. 1) of bearing tube 56, and is fastened in that position. The inner ring of rolling bearing 48 is arranged slidably (movable bearing) on shaft 42, so that the latter is pressed to the right in FIG. 10. The two rolling bearings 48, 50 can thereby form both a radial and an axial bearing for external rotor 28.

Figure 11:
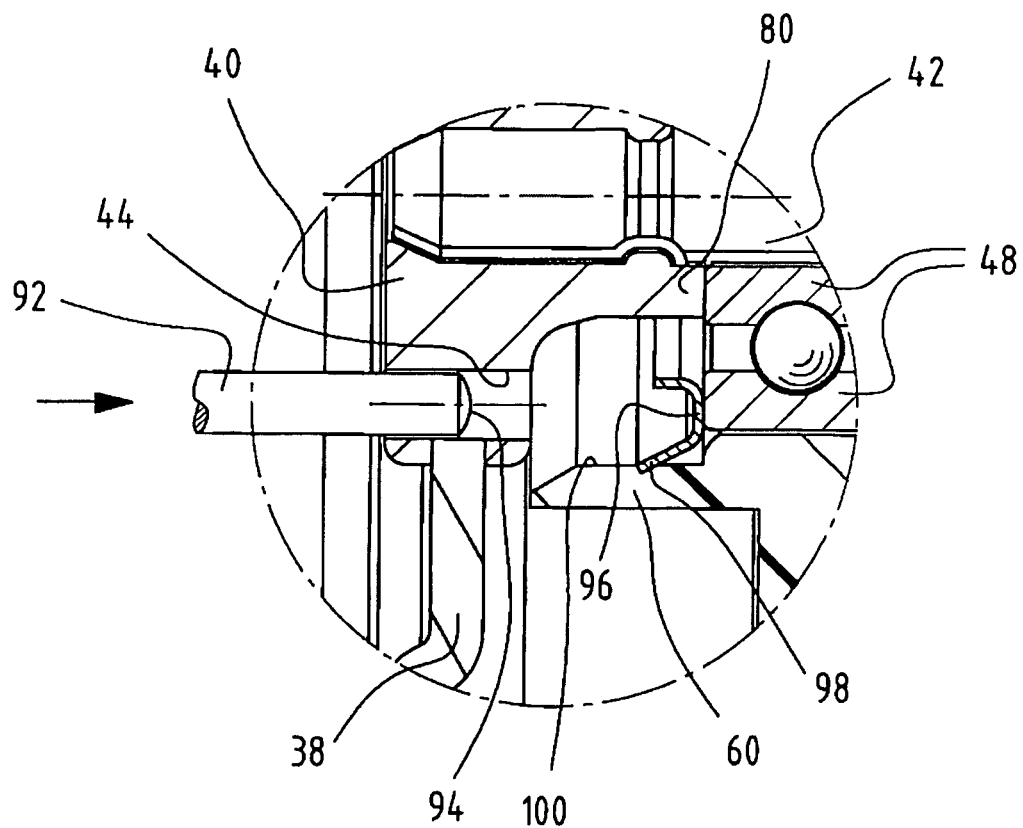
FIG. 11 is an enlargement of detail XI of FIG. 10, in which an assembly tool is additionally indicated.

As FIG. 9 shows, the two rolling bearings 48, 50 are pressed in the direction of an arrow 86 into longitudinal ribs 58 of bearing tube 56. This occurs with the aid of pins 92 that are passed through openings 44 of hub 40. FIG. 11 shows only one of said pins 92, which abut during assembly, with their right (in FIG. 11) ends 94, against a securing member 96 and press it against the outer ring of rolling bearing 48, the outer ring of rolling bearing 50 also being displaced by spacing member 52 (FIG. 9) to the right and being brought into abutment against shoulder 82 of bearing tube 56. In this manner, the outer rings of both rolling bearings 48, 50 are fastened in bearing tube 56.

Securing member 96 is fastened within collar 60, in the position that is attained, by the fact that it cuts with its sharp frustoconical claw edge 98 (FIG. 11) into inner side 100 of collar 60 and therefore can no longer be axially displaced to the left in FIG. 11, i.e. it creates a ratchet engagement. The result is that secure and zero-clearance assembly of rolling bearings 48, 50 in bearing tube 56 is achieved, and securing member 96 produces a hooking effect and tilt prevention for rolling bearings 48 and 50.

As FIG. 10 shows, a magnetically effective air gap 99 is located between internal rotor 20 and magnet 37 of rotor 28.

Internal stator 20 is completely encased with a plastic 62 in an injection molding operation. The following, inter alia, are suitable as plastics:

polyamides, e.g. Ultramid® A3X2G5 or polyamide 66 PBT, e.g. Technyl (PBT-G20FR).

These plastics can be reinforced with fibers, e.g. with approximately 20% to approximately 25% glass fillers. These substances can be welded, for example by ultrasonic welding or laser welding. Adhesive connections, seals, or sealing elements are alternatively possible, for example in the form of two-component plastic parts.

Figure 3:
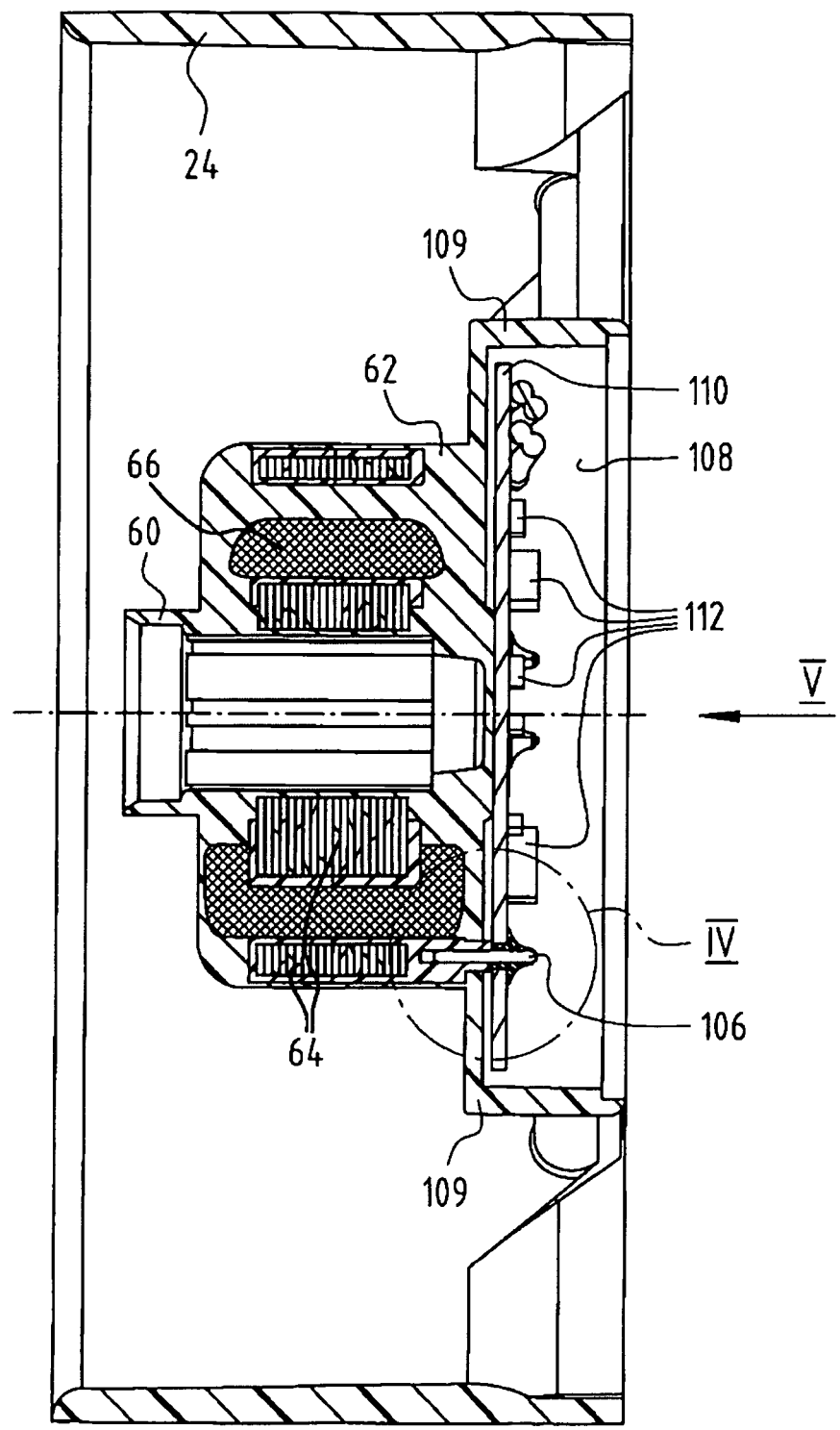
FIG. 3 is a depiction analogous to FIG. 1, but in which a circuit board on which electrical components of the motor are located is installed.

As shown, for example, by FIGS. 1 and 3, stator lamination stack 64 has a slot insulator 104 which forms a coil former into which is wound stator winding arrangement 66, whose shape and construction depend on the use of the motor, and which is therefore depicted only schematically.

Figure 4:
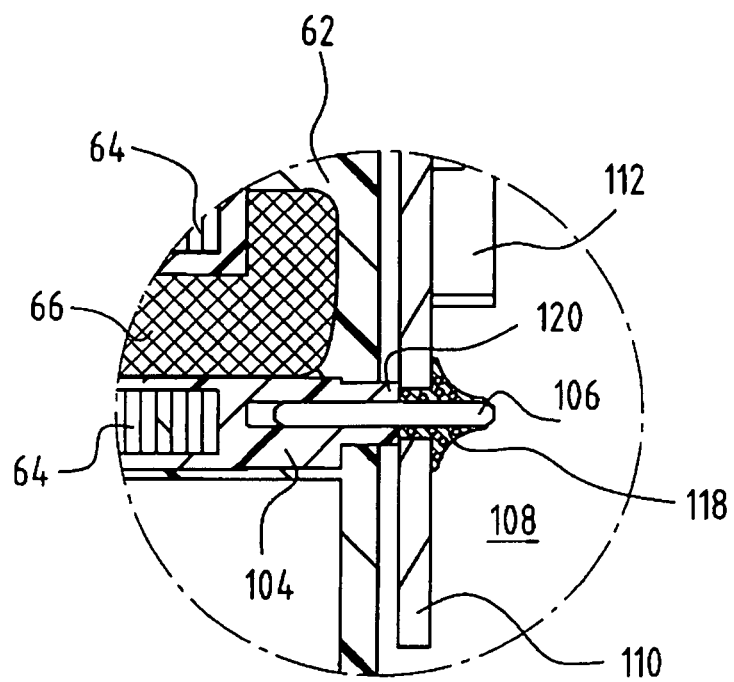
FIG. 4 is an enlarged depiction of detail IV of FIG. 3.

As FIG. 4 shows, contact pins 106, which project to the right in FIG. 4, are secured in this slot insulator 104. (FIG. 4 shows only one of these contact pins.) One end of a wire 154 of stator winding arrangement 66 can be electrically and mechanically secured to these contact pins 106. In this exemplifying embodiment, a total of four such pins 106 are provided on internal stator 20.

Figure 5:
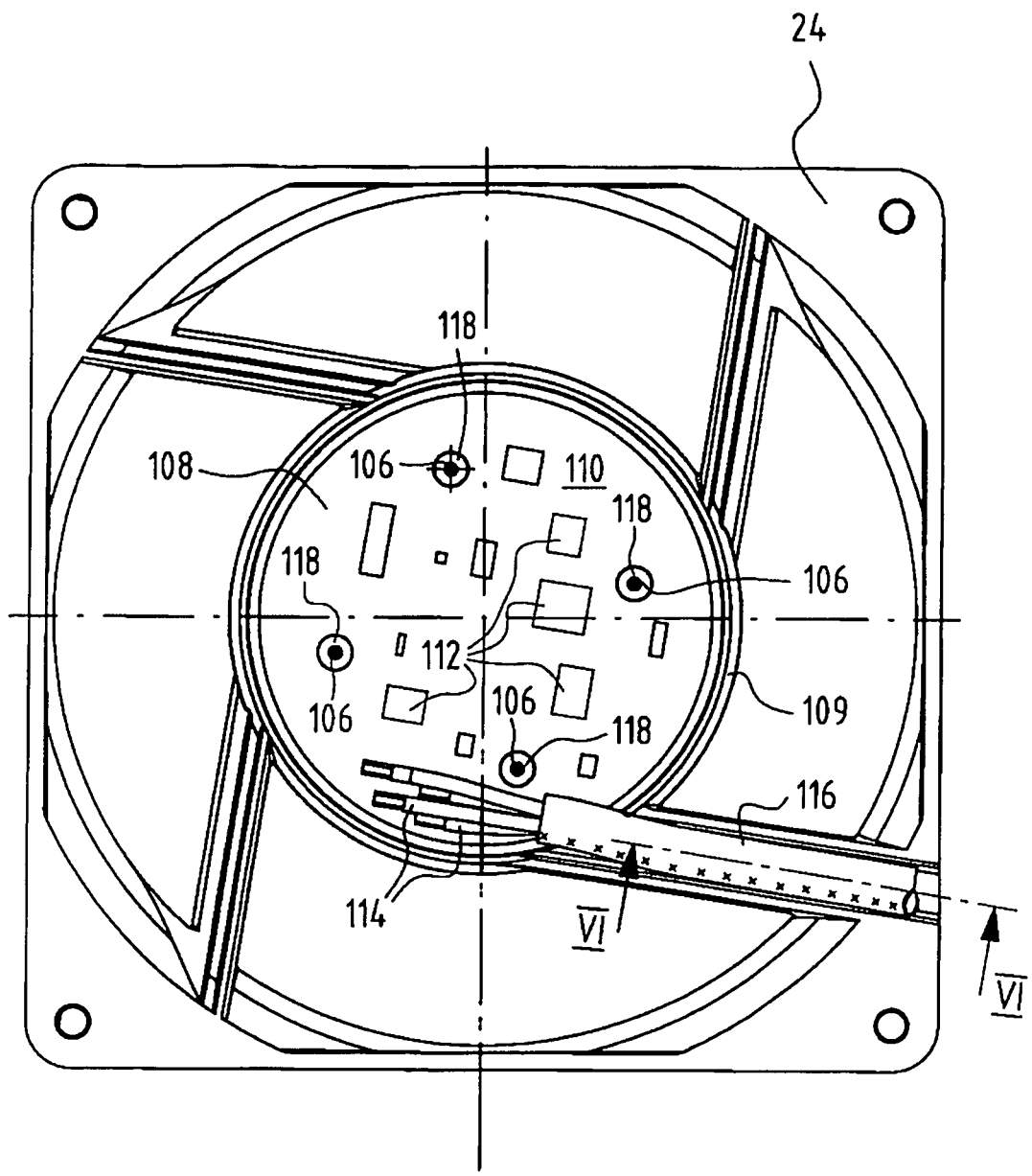
FIG. 5 is a plan view looking in the direction of arrow V of FIG. 3.
Figure 6:
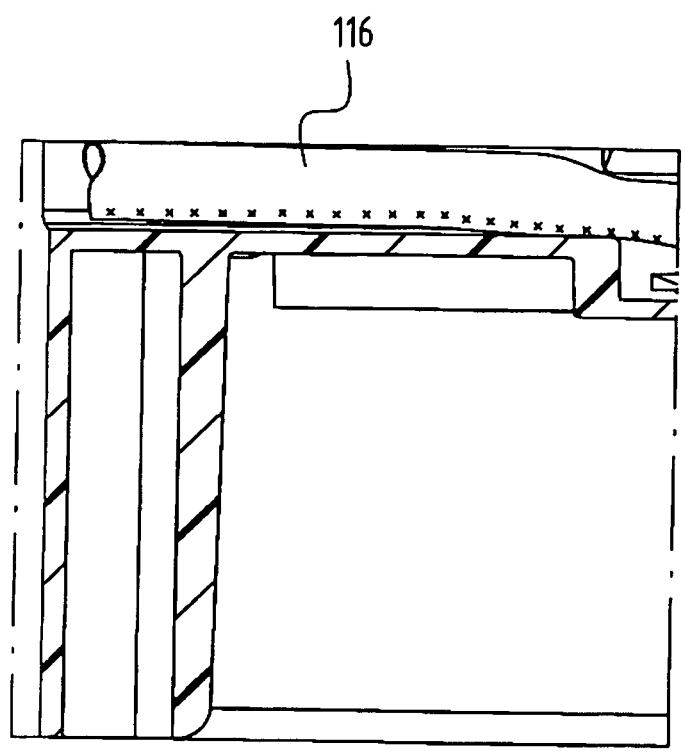
FIG. 6 is a section looking in the direction of line VI-VI of FIG. 5.
Figure 7:
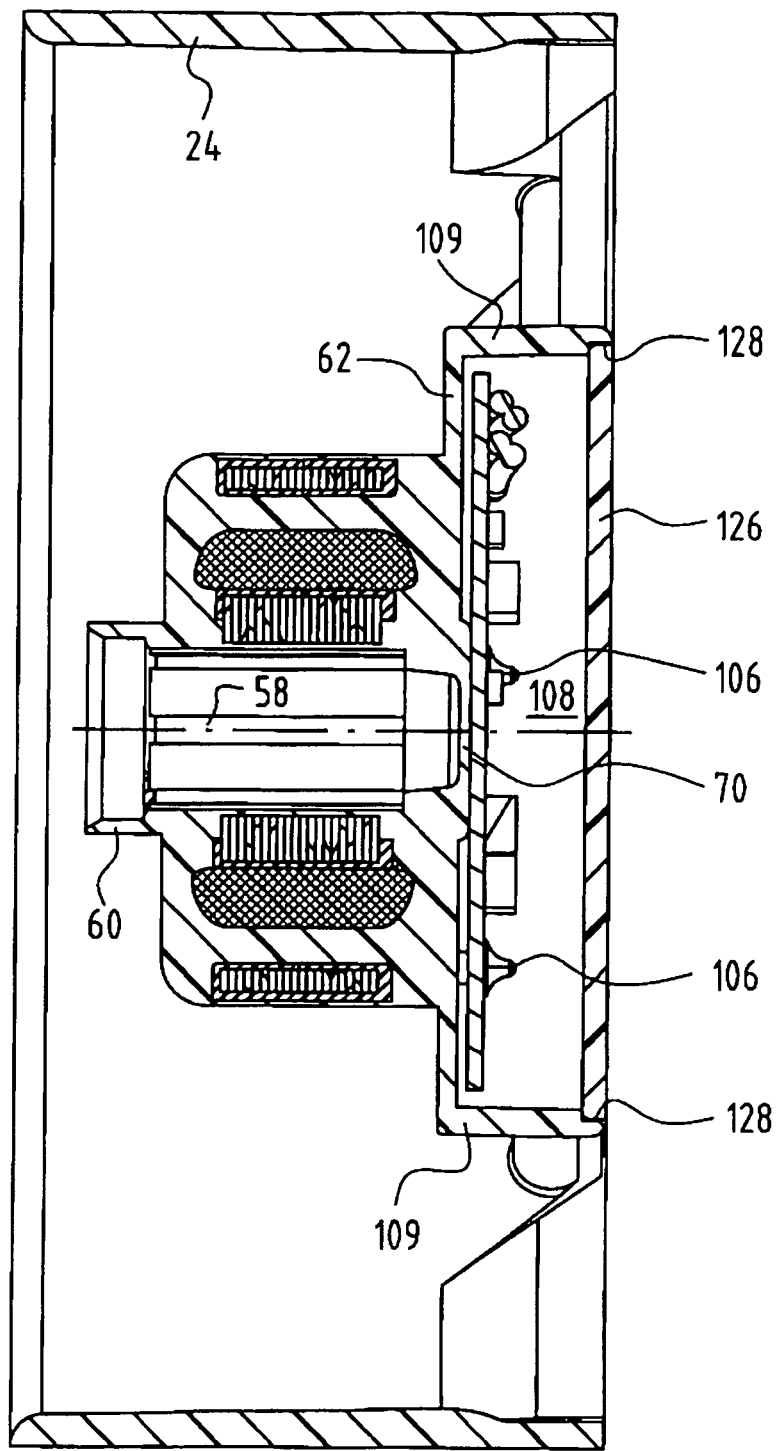
FIG. 7 is a depiction analogous to FIG. 3 but in the closed state.

In FIG. 1 and following, pins 106 project into a cavity 108 whose side wall is labeled 109 and in which is located (as shown in FIG. 3) a circuit board 110 on which electrical components 112 for motor 20 are arranged. As FIG. 5 shows, litz wire strands 114 of a connector cable 116 are attached to circuit board 110. Pins 106 are also soldered onto conductor paths of circuit board 110 by solder connections 118 (see FIG. 4). Circuit board 110 is held by spacing members 120 (FIG. 4) at a distance from plastic casing 62, which latter also forms the bottom and side wall 109 of cavity 108.

After being fitted with circuit board 110 and after litz wire strands 114 are attached (FIG. 5), cavity 108 is closed off with a cover 126. The latter can be, for example, welded with ultrasound to side wall 109 at weld joins 128, or with an adhesive bond.

It is particularly advantageous here that circuit board 110 having electrical components 112 is arranged in a cavity 108, so that components 112 are not overmolded with plastic; this might cause components 112 to be torn away from circuit board 110 by the change in volume as the encapsulating material hardens. This risk does not exist here. It is also not precluded in some cases, however, to overmold components 112 with plastic or provide them with a protective lacquer.

Figure 8:
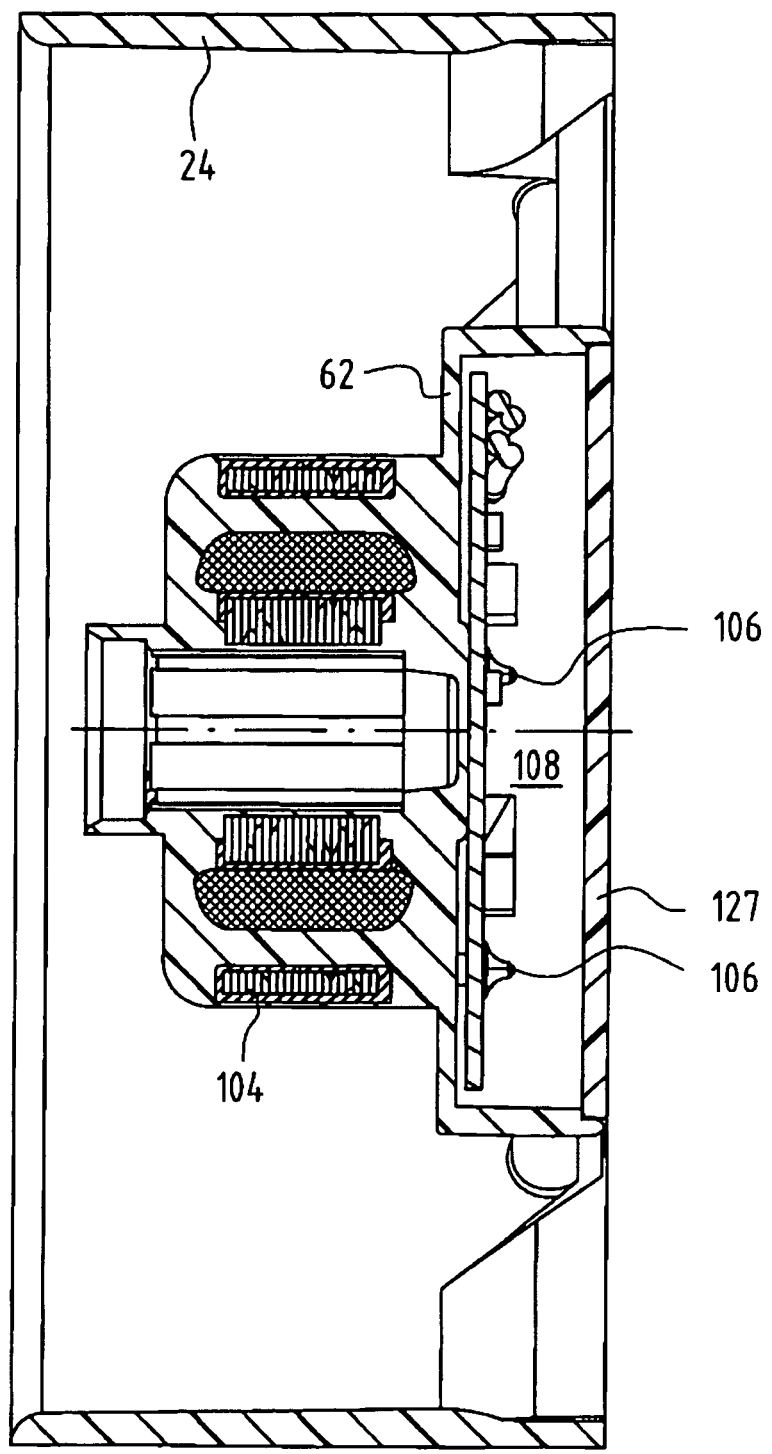
FIG. 8 is a variant of FIG. 7.

Instead of a cover 126, a closure cap 127 can also be used, as depicted by way of example in FIG. 8. Closure cap 127 can be secured, for example, by welding or adhesive bonding.

Figure 2:
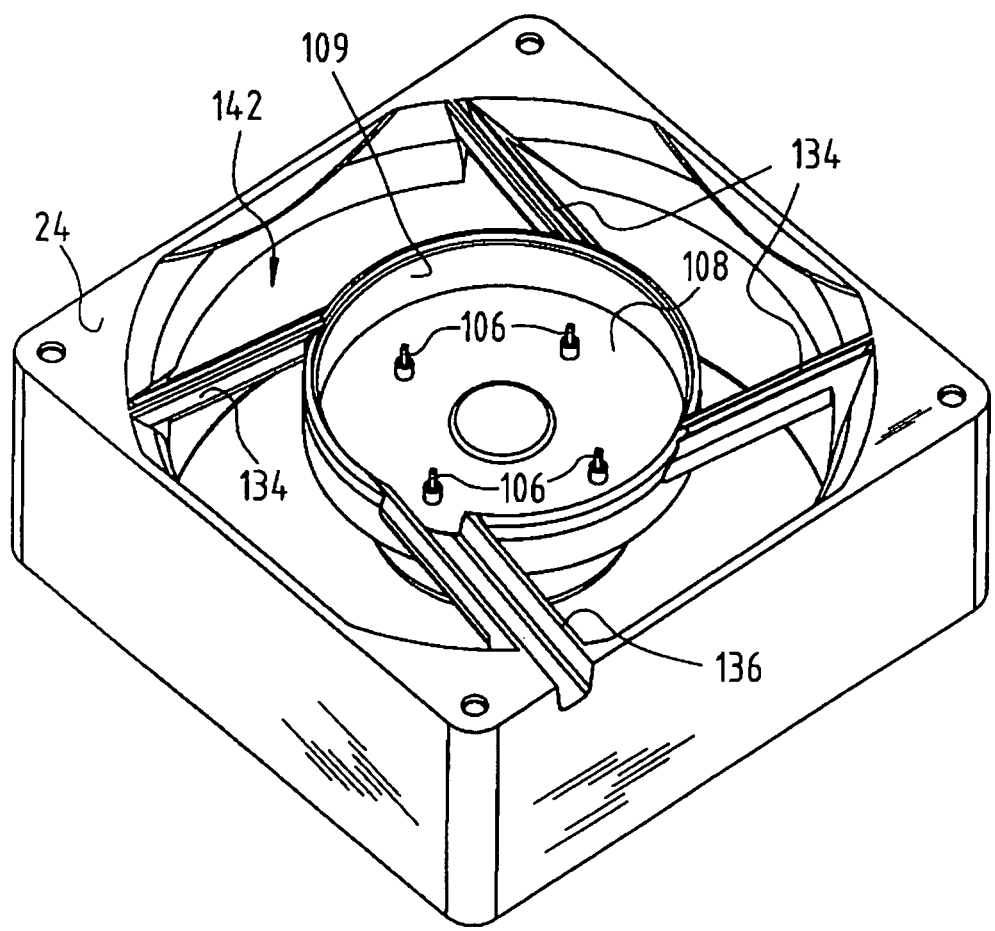
FIG. 2 is a perspective view of the basic structure of FIG. 1, viewed approximately in the direction of arrow II of FIG. 1.

As FIG. 2 shows, wall 109 of cavity 108 is connected via three simple spokes 134 and one channel-shaped spoke 136 to fan housing 24, which forms an air passthrough aperture 142 similar to a Venturi conduit. Spoke 136 serves for guidance of cable 116 (see FIG. 5). Cable 116 is sealed by means of a rubber seal (not visible).

Fan housing 24 is thus implemented integrally with a part of the wall of cavity 108 by means of spokes 134, 136, and integrally with the casing of internal stator 20, so that all these parts can be manufactured in a single working step; this simplifies and speeds up production and moreover reduces costs. Since the assembly of rotor 28 is also greatly simplified, the result is an inexpensive product with outstanding properties and a long service life.

FIG. 9 depicts, at 37, the permanent magnet of rotor 28 which is secured in magnetic yoke 38. Its magnetization can be implemented with two poles, four poles, six poles, etc.

FIG. 10 shows how blades 32 project into Venturi conduit 142.

FIG. 13 is a perspective depiction of a completely wound internal stator 20 that serves, so to speak, as a precursor product in the manufacture of a motor or fan. Its stator lamination stack 64 has, in this example, four identical salient poles 140, 142, 144, 146 and a magnetic yoke 148 having a central opening 149 in which, when the fan is complete, is located bearing tube 56 (FIG. 1) with its longitudinal ribs 158.

In this exemplifying embodiment, poles 140 to 146 have different outside diameters on their side facing toward air gap 99 (FIG. 10). In this state, a larger-diameter portion 150 is not yet covered with plastic. A smaller-diameter portion 152 is covered here with insulation made up of two mounted-on half-shells 174, 176. There are various possibilities, known from the existing art, for this covering of the internal stator: for example, as depicted, the use of the two half-shells 174, 176, or overmolding with insulating material, or the use of a special insulating paper. Contact pins 106, which are depicted e.g. in FIGS. 1 to 5, are also attached on upper half-shell 176. FIG. 14 shows how a winding wire 154 is secured to pin 106. For this, the latter is secured in a projection 162 of half-shell 176, and that projection also serves as a spacing member for circuit board 110 (see FIG. 3 or 4).

Located on stator poles 140 to 146 in this example are concentrated windings 164, 166, 168, 170 whose terminals are connected in the usual manner to contact pins 106. The use of a distributed winding and a corresponding lamination stack would of course also be possible.

As shown, for example, by FIG. 1, the wound internal stator 20 is overmolded on all sides with a plastic 62, i.e.

including at portions 150 of stator lamination stack 64, only a thin insulation layer (for example, 0.4 mm thick) being produced there.

As FIG. 1 shows, upon overmolding the cavities of internal stator 20 are filled up, bearing tube 56, 58 with its collar 60 is produced, also wall 109 of cavity 108 and spokes 134, 136, and lastly also fan housing 24, so that a fan is obtained, so to speak, in a "single shot."

After further assembly (circuit board 110, connector cable 116 (FIG. 5)), etc., external rotor 28 is installed as depicted in FIG. 9 and also described there, and lastly an identification plate is attached, etc.

The number of stator and rotor poles, the shape thereof, etc. are of course a function of the desired properties of the motor, as is known to one skilled in the art of electrical engineering. In some cases, for example, stator lamination stack 64 on the air-gap side can be covered with plastic not at all or only over a smaller area, or a very thin plastic layer is used.

Many further variants and modifications are possible, within the scope of the present invention.

What is claimed is:

1. A fan driven by an electronically commutated external-rotor motor, wherein said motor comprises:
   an internal stator (20) having a stator lamination stack (64);
   a permanent-magnet rotor (28) having a shaft (42) and bearings (48,50);
   a slot insulator (104) and a winding arrangement (66; 164, 166,168, 170), the winding arrangement (66; 164, 166, 168, 170) being associated with said stator lamination stack, wherein the internal stator is configured with a central opening (149) to receive the shaft (42) and said bearings (48,50) of the rotor;
   said permanent-magnet rotor (28) separated from the internal stator (20) by a magnetically effective air gap (99), wherein the rotor (28) is equipped on an outer side thereof with fan blades (32);
   said slot insulator (104) serving as a coil former for the winding arrangement (66; 164, 166, 168, 170) and having a plurality of projections (162);
   a plurality of electrical connector pins (106), each secured in a respective one of said projections (162) and having a respective end of a wire (154) of the winding arrangement electrically and mechanically connected to a respective one of said pins;
   a plastic overmold (56, 58) of the internal stator (20) extending on all sides of the internal stator (20) and forming, in the central opening (149) of the internal stator (20), a bearing tube configured to receive therein said bearings (48, 50) of the rotor (28) for journaling the shaft (42) and a cylindrical spacing member (52) axially interposed between said bearings (48,50) of the rotor, said bearing tube having a first end, adjacent to said rotor (28) and a second, closed end (70) remote from the rotor (28);
   the plastic overmold of the internal stator (20) forming a casing (62) having a wall element (109) and defining a cavity (108) for reception of electrical components (112) of the motor, which wall element is provided on a side of the stator lamination stack (64) facing away from the closed end (70) of the bearing tube formed in the stator;
   the plastic overmold of the internal stator (20) being in contact with the projections, the projections (162) thereby each being partly in contact with the wall element formed by the plastic overmold of the internal stator (20) and partly projecting out of the wall element into said cavity (108);
   said electrical connector pins (106) projecting out of the respective projections (162) into the cavity (108); and
   the plastic overmold of the internal stator (20) forming a fan housing (24) which is connected integrally, by means of connecting elements (134, 136), to the wall element (62) of the cavity (108), and which forms, together with the rotor (28), an air passage conduit (142) into which the fan blades (32) project.

2. The fan according to claim 1, wherein the bearing tube is equipped on an inner side with longitudinal ribs (58).

3. The fan according to claim 2, wherein an enveloping curve, defined by the inner ends of the longitudinal ribs (58), has, at least in part, a circular cross section.

4. The fan according to claim 1, wherein
   the bearing tube (56, 58) is formed, at the first end, with a collar (60), in which is secured a holding member (96) that retains a bearing of the bearings (48,50) in the bearing tube (56, 58).

5. The fan according to claim 4, wherein the holding member (96) has a claw edge (98) that points toward the rotor (28) and provides a hooking engagement with the inside of the collar (60) of the bearing tube (56, 58), thereby axially clamping at least one of said bearings (48,50).

6. The fan according to claim 1, wherein the bearings (48, 50) are arranged at a distance from one another in the bearing tube (56, 58), namely said bearing (48) mounted at an end of the bearing tube, and said bearing (50) mounted at the other end of the bearing tube, and wherein an outer ring of said bearing (50) engages an end face of a shoulder (92) formed in the bearing tube (56, 58), and said outer ring is braced with another side, via said cylindrical spacing member (52), against an oppositely located shoulder of an outer ring of the bearing (48), which outer ring is, in turn, retained in the bearing tube by said holding member (96).

7. The fan according to claim 1, wherein the rotor (28) comprises a hub (40) that is equipped, on a side facing toward the internal stator (20), with an axial projection (80) that is configured for abutment against an inner ring of an adjacent one of said bearings (48, 50), in order to enable said adjacent bearing to be pressed into the bearing tube (56, 58) by axial pressure on the rotor (28), the axial projection (80) being configured not to abut against an outer ring of said adjacent bearing.

8. The fan according to claim 7, further comprising
   a spring (78) coaxial with the shaft (42) of the rotor (28) and serving to apply a spring force, in order to urge said bearing (48, 50) toward one another.

9. The fan according to claim 1, wherein the wire (154) is, on its course from the pin to the winding, leaving the respective pin, on the side of the corresponding projection, projecting out of the wall element into said cavity.

10. The fan according to claim 9, wherein the cover (126; 127) is connected by an adhesive joint to a housing part (109) that serves for reception of the electrical components (112) of the motor.

11. The fan according to claim 9, wherein the cover (126; 127) is connected by a mechanical seal connection to a housing part (109) that serves for reception of the electrical components (112).

12. The fan according to claim 1, wherein said plastic overmold (56, 58) is composed of a polyamide material.

13. The fan according to claim 1, wherein the plastic overmold is composed of a PBT plastic material.

14. The fan according to claim 1, wherein the plastic overmold is composed of a fiber-reinforced plastic.

15. The fan according to claim 1, wherein the plastic overmold (56, 58) at least partly covers a central opening (149) of the internal stator (20).

16. The fan according to claim 1, wherein the plastic overmold forms, at least in part, an electrical insulator (62) for a part of the internal stator (20) which adjoins a magnetically effective air gap (99) of the motor.

17. The fan according to claim 1, wherein the winding arrangement (66; 164, 166, 168, 170) further comprises said electrical connector pins (106) which project away from the plastic overmold of the internal stator (20), in a direction toward a cavity (108) that is formed on a side of the internal stator (20) facing away from the rotor (28).

18. The fan according to claim 1, wherein the internal stator (20) is configured with cavities, said cavities being subsequently filled up by said plastic overmold (56, 58).

19. The fan according to claim 1, wherein said wire (154) of the winding arrangement is at least partly electrically and mechanically connected to the respective pin and to the winding arrangement (66; 164, 166, 168, 170) inside said respective projection (162), the wire (154) entering the inside of the projection (162) at an end of the projection which projects out of the wall element into said cavity (108) for reception of said electrical components (112) of the motor.

20. A fan driven by an electronically commutated external-rotor motor, wherein said motor comprises:

an internal stator (20) having a stator lamination stack (64);

a permanent-magnet rotor (28) having a shaft (42) and bearings (48,50);

a slot insulator (104) and a winding arrangement (66; 164, 166,168, 170), the winding arrangement (66; 164, 166, 168, 170) being associated with said stator lamination stack, wherein the internal stator is formed with a central opening (149) to receive the shaft (42) and said bearings (48,50) of the rotor;

said permanent-magnet rotor (28) separated from the internal stator (20) by a magnetically effective air gap (99), wherein the rotor (28) is equipped on an outer side thereof with fan blades (32) and includes a shaft (42) journalled in the said central opening (149) of the internal stator (20);

a plastic overmold (56, 58) of the internal stator (20) extending on all sides of the internal stator (20) and forming, in the central opening (149) of the internal stator (20), a bearing tube configured to receive therein said bearings (48, 50) of the rotor (28) for journaling the shaft (42), said bearing tube having a first, rotor-adjacent end and a second, closed end remote from the rotor (28) and being formed with a collar (60), in which is secured a holding member (96), the holding member (96) having a claw edge (98) that points toward the rotor (28) and provides a hooking engagement with the inside of the collar (60), the holding member (96) retaining one (48) of said bearings in the bearing tube (56, 58);

the plastic overmold of the internal stator (20) forming a casing having a wall element (62), and defining a cavity (108) for reception of electrical components (112) of the motor, which wall element (62) is provided on a side of the stator lamination stack (64) facing away from the closed end (70) of the bearing tube formed in the stator; and a fan housing (24) which is connected integrally, by means of connecting elements (134, 136), to the wall element (62) of the cavity (108), and which forms, together with the rotor (28), an air passage conduit (142) into which the fan blades (32) project, and wherein the rotor (28) is formed with a plurality of axially extending openings (44) being arranged on the rotor (28) such that a hypothetical axis through the axially extending opening and parallel to said shaft has an intersection with the holding member (96), each axially extending opening configured to receive, when the motor is assembled, a tool (92) that secures a lasting engagement of the holding member (96) against an outer ring of an adjacent one of the bearings (48,50).

* * * * *